United States Patent
Mazumdar et al.

(10) Patent No.: US 8,962,759 B2
(45) Date of Patent: *Feb. 24, 2015

(54) FUNCTIONALIZED ELASTOMER

(71) Applicant: The Goodyear Tire & Rubber Company, Akron, OH (US)

(72) Inventors: Arindam Mazumdar, Stow, OH (US); Frank James Feher, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/905,653

(22) Filed: May 30, 2013

(65) Prior Publication Data

US 2014/0357803 A1 Dec. 4, 2014

(51) Int. Cl.
| | | |
|---|---|---|
| *C08F 8/00* | (2006.01) | |
| *C08L 33/24* | (2006.01) | |
| *C08L 9/00* | (2006.01) | |
| *C08L 27/06* | (2006.01) | |
| *C08L 27/08* | (2006.01) | |
| *C08F 136/08* | (2006.01) | |

(52) U.S. Cl.
CPC .................................. *C08F 136/08* (2013.01)
USPC ........... 525/192; 525/218; 525/233; 525/266; 525/296

(58) Field of Classification Search
USPC .......................... 525/192, 218, 233, 266, 296
See application file for complete search history.

(56) References Cited

U.S. PATENT DOCUMENTS

| | | | |
|---|---|---|---|
| 6,462,141 B1 | 10/2002 | Kim et al. | |
| 6,780,948 B2 | 8/2004 | Rachita et al. | |
| 7,390,570 B2 | 6/2008 | Choi et al. | |
| 8,172,873 B2 | 5/2012 | Anthamatten et al. | |
| 8,217,103 B2 | 7/2012 | Thiele et al. | |
| 8,415,432 B1 | 4/2013 | Mruk et al. | |
| 8,536,266 B2 * | 9/2013 | Mruk et al. | .................... 524/555 |
| 2013/0165579 A1 | 6/2013 | Mruk et al. | |
| 2013/0165587 A1 | 6/2013 | Mruk et al. | |
| 2013/0165588 A1 | 6/2013 | Mruk et al. | |
| 2013/0165589 A1 | 6/2013 | Mruk et al. | |

FOREIGN PATENT DOCUMENTS

| | | |
|---|---|---|
| JP | 2001123018 A | 5/2001 |
| JP | 2011184511 A | 9/2011 |

OTHER PUBLICATIONS

JP2011184511 English Translation.
Li et al, End Group Transformations of RAFT-Generated Polymers with Bismaleimides: Functinoal Telechelics and Modular Block Copolymers, Journal of Polymer Science: Part A: Polymer Chemistry, 2008, 5093-5100, 46.
Yang et al, Thermo-Sensitive Electrospun Fibers Prepared by a Sequential Thiol-Ene Click Chemistry Approach, Journal of Polymer Science: Part A: Polymer Chemistry, 2012, 4182-4190, 50.
Yu et al, Sequential Thiol-Ene/Thiol-Ene and Thiol-Ene/Thiol-Yne Reactions as a Route to Well-Defined Mono and Bis End-Functionalized Poly(N-isopropylacrylamide), Journal of Polymer Science: Part A: Polymer Chemistry, 2009, 3544-3557, 47.

* cited by examiner

*Primary Examiner* — Nathan M Nutter
(74) *Attorney, Agent, or Firm* — John D. DeLong

(57) ABSTRACT

The present invention is directed to a copolymer comprising: a polyisoprene backbone chain with a microstructure comprising grater than 98 percent by weight of cis 1,4 linkages; and polymeric sidechains bonded to the backbone chain, the sidechains comprising a polymer derived from a monomer having a hydrogen bond donor site and a hydrogen bond acceptor site.

15 Claims, 2 Drawing Sheets

FUNCTIONALIZED ELASTOMER

BACKGROUND

Polyisoprene is a key material for producing a broad range of consumer and industrial products. The two most common forms for polyisoprene are "natural rubber" and "synthetic polyisoprene". Natural rubber typically is derived from latex produced by *Hevea brasiliensis* (i.e., the common rubber tree), although a broad range of other plants (e.g., guayule and *Taraxacum kok-Saghyz* (aka Russian dandelion)) also are known to produce stoichiometrically similar, rubber-like materials. Unlike natural rubber, which is only formally derived from polymerization of isoprene, synthetic polyisoprene is actually produced by large-scale, industrial polymerization of isoprene monomer.

The structures of synthetic polyisoprene (PI) and natural rubber (NR) are similar enough to allow for free substitution of either rubber in many applications, but there are important differences. For example, rubber produced by the rubber tree has a high molecular weight and a tendency to crystallize more completely and faster than commercially available synthetic PI. The high molecular weight is desirable for imparting "green strength" during tire manufacturing. The rapid strain-crystallization of rubber is believed to be responsible for the excellent wear and tear properties of natural rubber-especially under severe conditions.

Early efforts to develop synthetic PI as a replacement for natural rubber elucidated much of the fundamental technology and allowed commercialization of synthetic PI to be achieved in the 1960's. (see e.g. Schoenberg, et al Rubber Chem Tech. 52, 526-604 (1979)) In general, the following characteristics are believed to be desirable in synthetic PI intended for tire applications: high cis-content (vs trans content); high 1,4-addition (vs 3,4-addition); high head-to-tail content; and high molecular weight.

Subsequent efforts to achieve the highest practical level for each characteristic—especially using Neodymium-based Ziegler/Natta-type catalysts have built upon the early work and led to today's best synthetic replacements for NR. (see e.g. Friebe, et al Adv. Polym. Sci. 204, 1 (2006))

For several decades, it was believed that the differences between natural rubber and synthetic rubber were the result of natural rubber having an almost pure cis-1,4 stereochemistry and branched polymer chain structures. The potential role of non-rubber constituents in natural rubber was largely ignored. It now appears from extensive recent work by Prof. Yasuyuki Tanaka and coworkers that the non-rubber components play an essential role in determining the properties and performance of natural rubber. (see e.g., Tanaka, et al Polymer 41, 7483-8 (2000); Rubber Chem. Tech. 74, 355-75 (2001); Biopolymers 2, 1-25 (2001)) This is particularly true for *Hevea* rubber, which clearly has a structure with nanometer-scale phase domains that can explain many of the property differences between natural rubber and synthetic rubber. In other words, natural rubber is best viewed as a nanostructured elastomer rather than a hydrocarbon polymer with non-hydrocarbon impurities.

SUMMARY

The present invention is directed to a copolymer comprising: a polyisoprene backbone chain with a microstructure comprising grater than 98 percent by weight of cis 1,4 linkages; and polymeric sidechains bonded to the backbone chain, the sidechains comprising a polymer derived from a monomer having a hydrogen bond donor site and a hydrogen bond acceptor site.

DESCRIPTION

Figure 1:
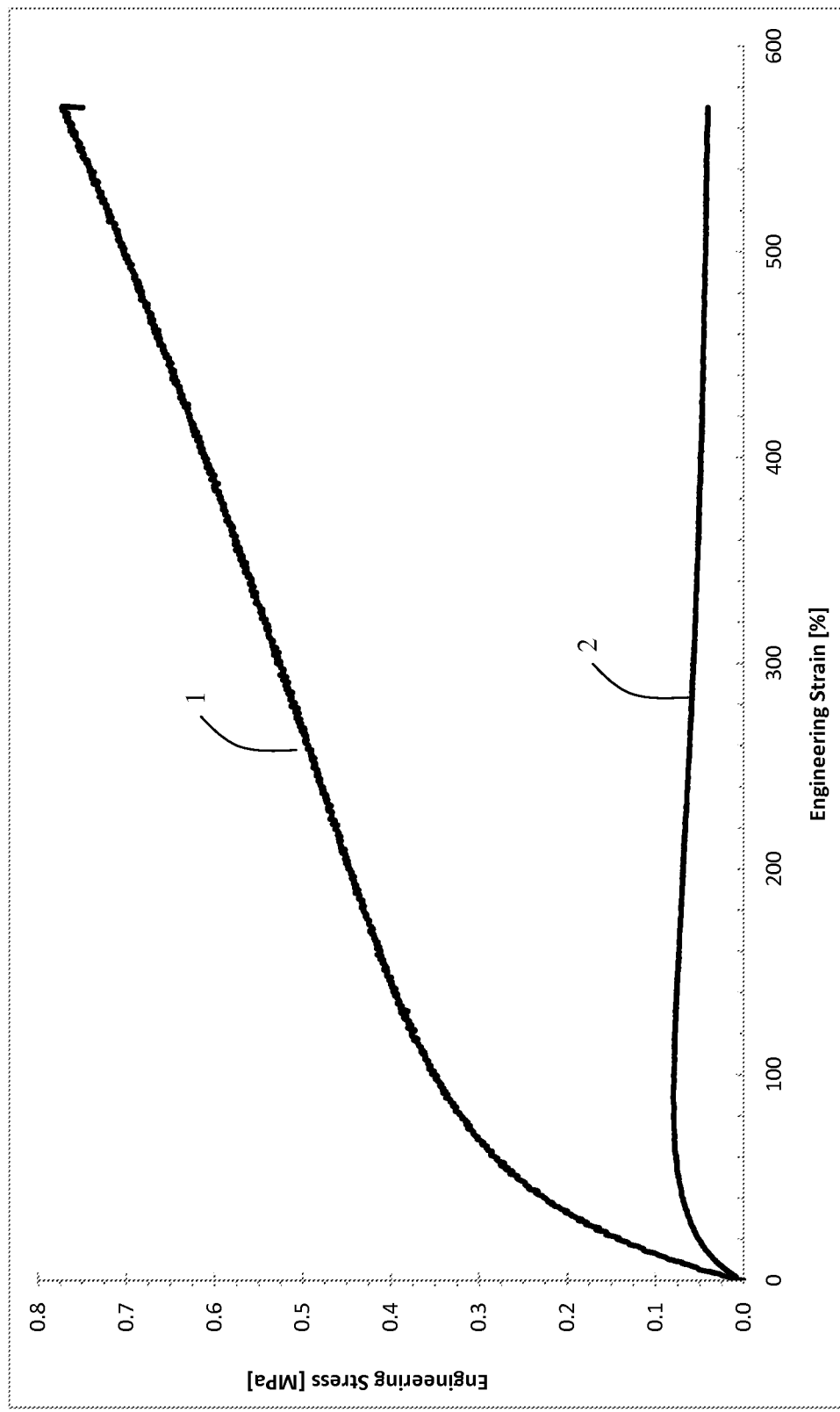
FIG. 1 is a graph of stress versus strain for elastomer samples.

There is disclosed a copolymer comprising: a polyisoprene backbone chain with a microstructure comprising greater than 98 percent by weight of cis 1,4 linkages; and polymeric sidechains bonded to the backbone chain, the sidechains comprising a polymer derived from a monomer having a hydrogen bond donor site and a hydrogen bond acceptor site.

In one embodiment, the copolymer has the structure of formula I $$X\text{---}[Y\text{---}Z]_n \qquad (I)$$

where X is a polyisoprene having greater than 98 percent by weight of cis 1,4 linkages;

Z is a polymer derived from a monomer having a hydrogen bond donor site and a hydrogen bond acceptor site;

Y is a dithiol linking group having the structure of formula II $$\text{---S---R---S---} \qquad (II)$$

where S is sulfur and R is a divalent organic group, and one S is covalently bonded to X through a thioether linkage and the other S is covalently bond to Z through a thioether linkage; and n is the number of —[Y—Z] groups bonded to X.

Various strategies have been attempted for the synthesis of functionalized polyisoprene (PI) of formula I which can show increase in tensile strength by inducing nanostructure formation thereby mimicking natural rubber (NR). One objective is to use polyisoprenic polymers with high cis-content which would enable the strain induced crystallization as observed in NR. One chemical route to such synthetic polymers utilizes synthesis of functionalized polyisoprene having groups which can exhibit non-covalent intermolecular interactions (e.g. hydrogen bond, Vander Waal's, electrostatic etc.). The most commonly used route for accessing moderate to high cis-PI are Neodymium polymerization and anionic polymerization. It has now been found that a functionalized polyisoprene may be obtained through a sequence of partial epoxidation of high cis polyisoprene, reacting the epoxy groups with a multifunctional coupler such as a dithiol, followed by grafting a polymer derived from a monomer having a hydrogen bond donor site and a hydrogen bond acceptor site to the coupler.

Polyisoprene suitable for functionalization includes high-cis polyisoprenes with cis 1,4 microstructure of greater than 98 percent by weight. Suitable polyisoprenes include synthetic polyisoprenes made by solution polymerization with Ziegler-Natta catalysts such as a neodymium catalyst, and naturally occurring polyisoprene such as guayule rubber. Such polyisoprenes are well known in the art and commercially available.

Functionalization of the polyisoprene to produce the copolymer I may be done by a multistep synthesis including 1) partial epoxidation of the polyisoprene X to produce an epoxidized polyisoprene, 2) a ring-opening reaction of the oxirane groups of the epoxidized polyisoprene with a dithiol to produce a thiol functionalized polyisoprene, and 3)thiol-ene reaction of the thiol functional polyisoprene with a thiolophile-functionalized polymer Z derived from monomers having a hydrogen bond donor moiety and hydrogen bond acceptor moiety. "Thiolophile" as used herein refers to a functional group susceptible to reaction with a thiol in a thiol-ene or thiol-yne reaction, as are known in the art.

Partial epoxidation of the polyisoprene may be accomplished using methods as are known in the art. In one embodiment, the polyisoprene is subjected to a peroxidation reaction (Prilezhaev reaction). In this embodiment, the polyisoprene is reacted with a suitable peroxy acid to randomly convert a fraction of the polyisoprene carbon-carbon double bonds to oxirane rings as shown in Scheme 1. Suitable peroxy acids include meta-chloroperoxybenzoic acid (mCPBA) and the like.

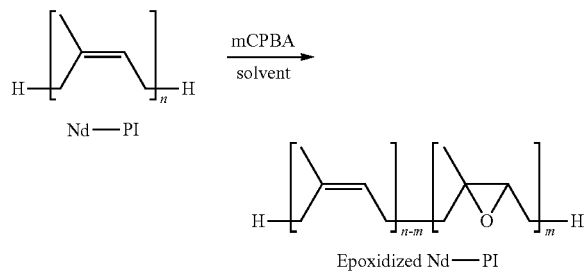

Scheme 1

The partially epoxidized polyisoprene is converted to a thiol-functionalized polyisoprene by reacting at least some of the oxirane rings of the epoxidized polyisoprene with a dithiol of formula HS—R—SH, where R is an organic group. The reaction may be performed in alkaline environment in a suitable solvent such as THF at room temperature until achieving the desired degree of functionalization, as shown in Scheme 2.

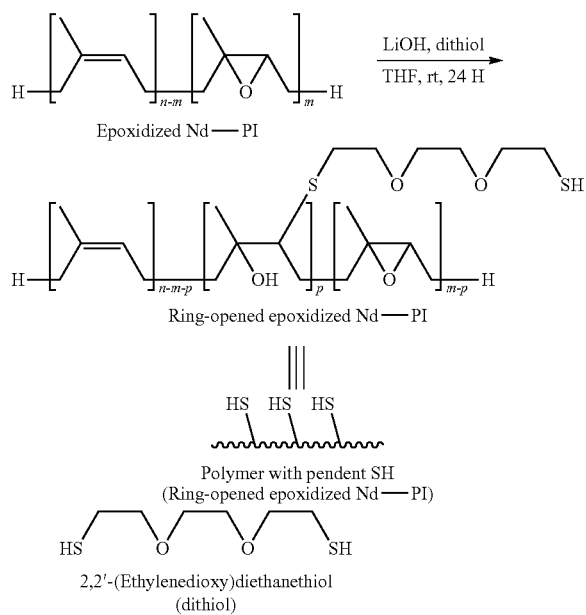

Scheme 2

In one embodiment, R is —[(CH$_2$)$_2$—O—]$_k$—(CH$_2$)$_2$— where k is an integer ranging from 1 to 10 and the dithiol is a polyethylene glycol dithiol. In one embodiment, k=2 as seen in Scheme 2.

In one embodiment, the dithiol attached to the epoxidized polyisoprene ranges from 0.001 to 20 percent by weight, based on the weight of the polyisoprene.

As seen in Scheme 2, the copolymer includes hydroxyl groups resulting from the ring opening of the oxirane, and may also include unopened oxirane groups.

In one embodiment, the polymer Z derived from a monomer having a hydrogen bond donor moiety and a hydrogen bond acceptor moiety includes homopolymers and copolymers of various monomers, including but not limited to polymers of: acrylamides and substituted acrylamides, methacrylamides and substituted methacrylamides, acrylic acids and substituted acrylic acids, methacrylic acids and substituted methacrylic acids.

The term "hydrogen bond" is used herein in the same manner as would be understood by one of ordinary skill in the art. The terms "hydrogen bond acceptor moiety" and "hydrogen bond donor moiety" are defined herein as moieties that are capable of forming a hydrogen bond when at least one acceptor moiety and at least one donor moiety are present.

In one embodiment, the polymer Z is a polymer of a monomer of formula III

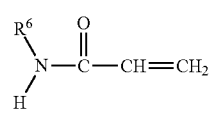

(III)

where $R^6$ is selected from the group consisting of C2 to C6 linear alkyl, C2 to C6 branched alkyl, and C3 to C6 cycloalkyl.

In one embodiment, Z is of formula (IV)

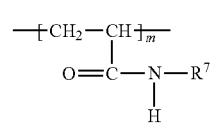

(IV)

where $R^7$ is selected from the group consisting of C2 to C6 linear alkyl, C2 to C6 branched alkyl, and C3 to C6 cycloalkyl.

In one embodiment, the polymer Z is a polymer of an N-substituted monoalkyl acrylamide derivative.

In one embodiment, the polymer Z is a polymer of N-isopropylacrylamide.

In one embodiment, the polymer Z has a weight average molecular weight ranging from about 500 to about 20000 g/mol.

In one embodiment, the copolymer comprises from about 1 to about 20 weight percent Z.

The copolymer of formula I may be produced by various methods. In one embodiment, the copolymer may be produced by functionalizing the polymer X with the polymer Z to produce a graft copolymer with an elastomer backbone X and pendant Z. A convenient way for the functionalization of a variety of elastomers is the thiol-ene reaction during which an unsaturated carbon-carbon bond present in an appended functional group (the thiolophile) of the polymer Z reacts with a thiol to form a thioether. For example, an alkene moiety being present in the maleimide group of a maleimide terminated polymer Z may act as the thiolophile. In order to allow the functionalization of the polymer X, an in-chain thiol-functionalized version of the polymer X is used.

Various thiolophile-functionalized versions of the polymer Z may be used. Suitable thiolophile groups include but are not limited to maleimido groups, allylic groups, and alkynyl groups. In one embodiment, a maleimido-functionalized N-isopropylacrylamide polymer (PNIPAM) is used as available commercially from Aldrich. Both mono- and bismaleimido functionalized PNIPAM may be used, as are known from Li et al, J. Polym. Sci. Part A, 46 (2008), 5093. Allylic- and alkynyl-functionalized versions of PNIPAM are also known from Yu et al., J. Polym. Sci. Part A 47 (2009) 3544.

The polymer X having pendant thiol groups may be reacted with the maleimide-terminated polymer Z in a thiol-ene reaction to form the copolymer as illustrated in Scheme 3, where the polymer Z is shown as maleimide-terminated PNIPAM, poly(N-isopropylacrylamide).

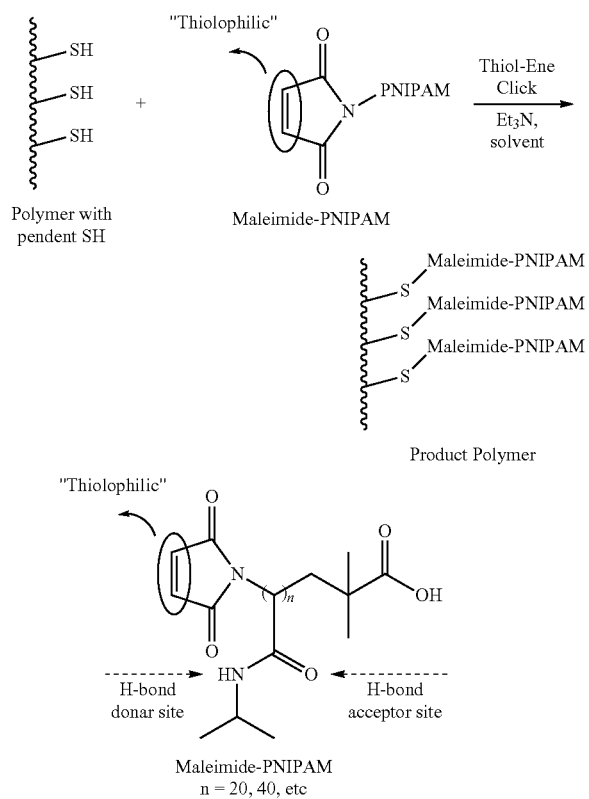

The end-functionalized copolymer of formula I may be compounded into a rubber composition.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4 polybutadiene), polyisoprene (including cis 1,4 polyisoprene), butyl rubber, halobutyl rubber such as chlorobutyl rubber or bromobutyl rubber, styrene/isoprene/butadiene rubber, copolymers of 1,3 butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E SBR having a medium to relatively high bound styrene content, namely, a bound styrene content of about 30 to about 45 percent.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the Journal of the American Chemical Society, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm3/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3 bis(trimethoxy or triethoxy silylpropyl) polysulfides. In one embodiment, the sulfur containing organosilicon compounds are 3,3'-bis(triethoxysilylpropyl) disulfide and/or 3,3 bis(triethoxysilylpropyl)tetrasulfide.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr.

In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140 C and 190 C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100 C to 200 C. In one embodiment, the vulcanization is conducted at temperatures ranging from about 110 C to 180 C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Reagents

Dichloromethane (DCM), tetrahydrofuran (THF), methanol (MeOH), triethylamine ($Et_3N$), meta-Chloroperoxybenzoic acid (mCPBA), Lithium Hydroxide (LiOH), and maleimide-functionalized Poly(N-isopropylacrylamide) (Maleimide-PNIPAM) were purchased commercially from Sigma-Aldrich and used as received without any further distillation/purification treatment. 2,2'-(Ethylenedioxy)diethanethiol (dithiol, DTH) were also purchased from Sigma-Aldrich and dried over molecular sieves before use. High cis-Neodymium Polyisoprene (Nd—PI) was synthesized using standard Neodymium polymerization as disclosed for example in U.S. Pat. No. 6,780,948. The Nd—PI prepared for this work has a cis-content of greater than 98%.

Instruments:
  a) Nuclear Magnetic Resonance (NMR): $^1$H NMR spectra were recorded on a Varian INOVA 400 MHz spectrometer. Chemical shifts are given in parts per million (ppm) either by using tetramethylsilane (TMS, $\delta$=0.00) or the residual protic solvent peak (for $CHCl_3$, $\delta$=7.26 and for $CH_2Cl_2$, $\delta$=5.30) as a shift reference for $^1$H NMR spectra.
  b) Tensile Testing: Physical testing of the solution cast polymer films were done on a MTS Tensile Tester with 100 N load cell. Engineering strain rate of 10%/s was applied to each samples which corresponded to a displacement rate of 2.6 mm/s.
  c) Gel Permeation Chromatography (GPC): GPC analysis was done using Agilent 1100 Series-LC with a Wyatt Technologies MiniDawn detector and Gilson 234 Auto sampler. THF was used as the mobile phase at a flow rate of 1.00 mL/min at a column temperature of 35° C. Astra 4.73.04 software was used for analysis of the chromatogram and determining calculated sample mass, molecular weight (Mw, Mn) and polydispersity ($PDI=M_w/M_n$).

Reaction System:
For all reactions, the polymer was charged into the reaction vessel (typically a round bottom flask or a reactor) and the solvent was added to dissolve the polymer. All reactions were performed under nitrogen just as a routine practice and not as a stringent requirement. Unless otherwise stated, the reactions are carried out at room temperature (rt).

Example 1

To a 250 mL DCM solution of Nd—PI (5.2 g, 7.6 $e^{-2}$ mols) at 0° C. was added a DCM solution (4 mL) of mCPBA (0.0188 g, 8.39 $e^{-5}$ mols, 77% pure mCPBA) targeting a 0.11% epoxidation level. The reaction mixture was stirred at 0° C. for 6 hours. At the end of this time, the polymer was isolated and purified by precipitation in methanol. $^1$H NMR analysis of the polymer showed the appearance of new resonances at $\delta$ 2.69 ppm, $\delta$ 1.57 ppm, and $\delta$ 1.29 ppm corresponding to the epoxide formation. Calculation based on the $^1$H NMR integrals of the protons attached to the epoxydized and unepoxidized carbon-carbon double bonds indicated 0.11% epoxidation of the polymer backbone of Nd—PI. The epoxide groups are randomly distributed along the polymer chain rather than as a block.

Guayule Rubber (coagulated) was also successfully epoxidized using the chemistry described in Example 1. Table 1 summarizes the results of the synthesis of epoxidized elastomers with various mol % of epoxidation levels.

TABLE 1

| Sample | $M_w$(kDa) | Polymer | % cis-content | % Epoxidized[a] |
|---|---|---|---|---|
| 1 | ~1000 | Nd PI | >98 | 10 |
| 2 | ~1000 | Nd-PI | >98 | 0.22 |
| 3 | ~1000 | Nd-PI | >98 | 0.11 |
| 4 | ~1000 | Nd-PI | >98 | 0.05 |
| 5 | ~950 | Guayule | >99 | 10 |
| 6 | ~950 | Guayule | >99 | 0.11 |

[a]Target epoxidation = actual epoxidation as monitored by $^1$H NMR

Using the appropriate molar % of mCPBA, this route could be efficiently used for achieving any desired level of epoxidation (0.001 mol % to 100 mol %) on any polymer containing a terminal or internal diene. The same reaction can also be done at any temperatures ranging from −78° C. to the boiling temperature of the solvent used. The rate of reaction would vary with the temperature of the reaction e.g., at room temperature the reaction proceeds to completion in less than 1-15 minutes in most solvents. Other solvents such a THF, hexanes, benzene, and other aliphatic or aromatic solvents could also be used successfully as the reaction media. A co-solvent could also be used in cases when the mCPBA is not soluble in the polymer solution.

Example 2

Epoxidized Nd—PI (5.3 g, 8.55 e$^{-5}$ mols epoxy groups) was dissolved in 100 mL of THF in a round-bottom flask at room temperature. LiOH (0.02 g, 8.56 e$^{-4}$ mols with respect to epoxy groups) was added to the solution followed by the addition of 2,2'-(Ethylenedioxy)diethanethiol (dithiol, DTH) (0.16 g, 8.56 e$^{-4}$ mols with respect to epoxy groups). The reaction mixture was stirred at rt for 24 hours. At the end of this time, the polymer was isolated and purified by precipitation in methanol. $^1$H NMR analysis of the polymer showed the appearance of two very characteristic resonances: a multiplet at ~δ 3.63-δ 3.71 ppm corresponding to the 'ethylenedioxy' groups and another multiplet at ~δ 2.70-δ 2.72 ppm corresponding to the —CH$_2$— attached to the terminal SH-atom connected to the polymer backbone at the point of the ring-opened epoxide.

Example 3

Ring-opened epoxidized Nd—PI (5.3 g, 8.55 e$^{-5}$ mols of pendant thiol) was dissolved in 250 mL of THF in a round-bottom flask at room temperature. To this solution was added a THF solution of Maleimide-PNIPAM (0.86 g, 3.42 e$^{4}$ mols) followed by the addition of excess Et$_3$N. The reaction mixture was stirred for 5-15 min at room temperature. At the end of this time, the polymer was isolated and purified by precipitation in methanol. Gel Permeation Chromatography (GPC) analysis was performed to confirm the quantitative removal of the unreacted Maleimide-PNIPAM from the product copolymer. The $^1$H NMR resonances assigned to the maleimide protons at δ 6.69 ppm disappeared and a new resonance appeared at δ 4.03 ppm corresponding to the —CH— of the isopropyl group of the Maleimide-PNIPAM. The reaction yield was quantitative. This maleimide-PNIPAM grafted product copolymer of 1 MM Nd—PI has an average of maximum 0.11 mol % PNIPAM grafted on each polymer chain.

Example 4

Tensile testing was done on maleimide-PNIPAM grafted product copolymer of 1 MM Nd—PI synthesized in Example 3. A solution-based film of the maleimide-PNIPAM grafted product copolymer was casted and the solvent was allowed to evaporate completely. The tensile test data of the dried cast-film is shown in FIG. 1. The control for comparison of the tensile strength was the unfunctionalized 1 MM Nd—PI. As can be seen from FIG. 1, the maleimide-PNIPAM grafted product copolymer of 1 MM Nd—PI (1) has a tensile strength significantly higher than the control unfunctionalized 1 MM Nd—PI (2). GPC of the product copolymer showed that the molecular weight is around 1 MM, which indicated that no chemical cross-link occurred during the reaction. Hence the increase in tensile strength of the green polymer is purely due to intermolecular non-covalent interaction between the in-chain grafted maleimide-PNIPAM groups.

Figure 2:
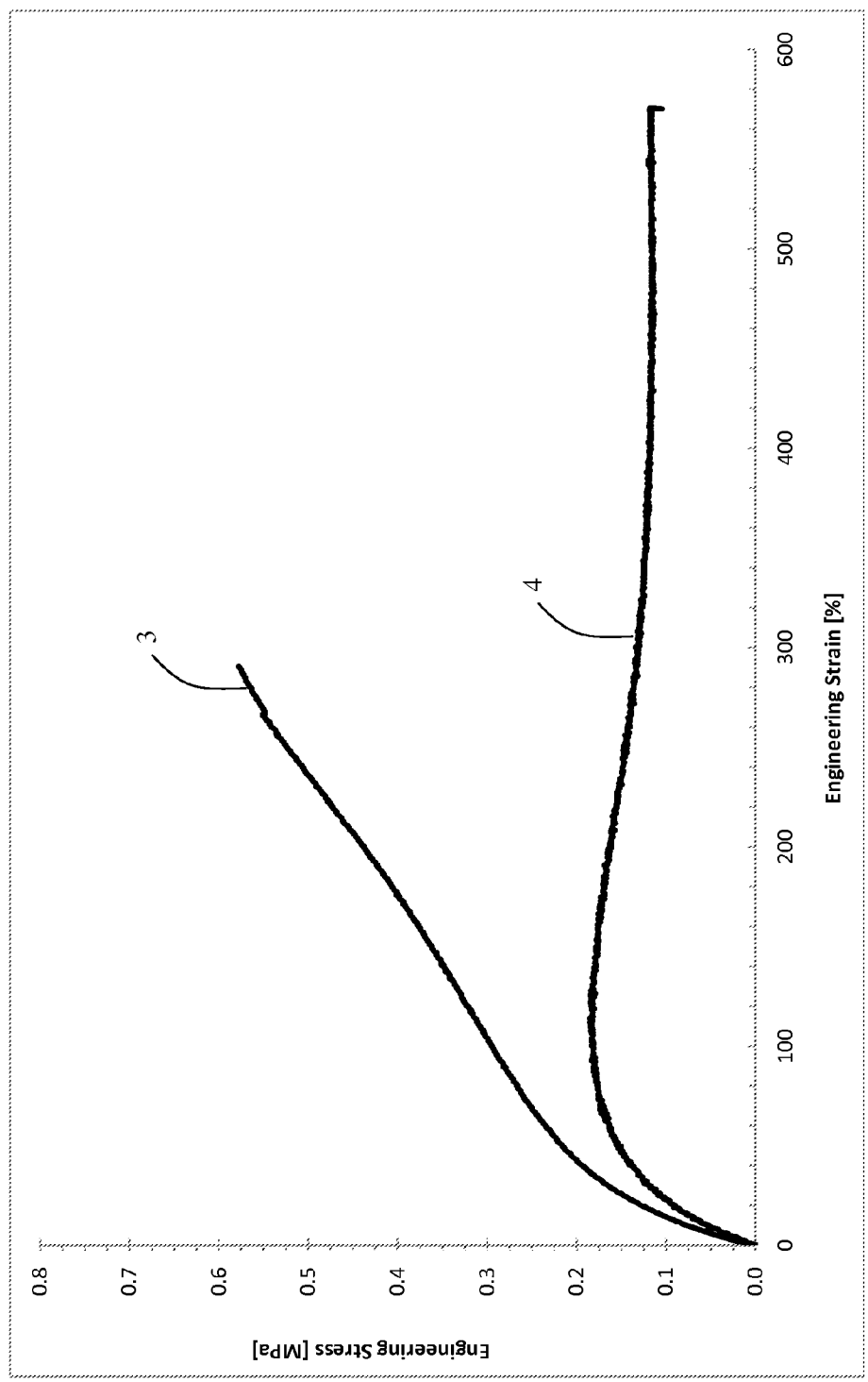
FIG. 2 is a graph of stress versus strain for elastomer samples.

Tensile testing was also performed on solution cast film of maleimide-PNIPAM grafted copolymer of Guayule rubber ($M_w$ of Gualyule rubber is approx 950 kDa). The tensile test data of the dried cast-film is shown in FIG. 2. It can be seen that the in-chain grafting of PNIPAM on Guayule (3) significantly increased the tensile strength of the Guayule rubber as compared with unfunctionalized Guayule rubber (4). All the tensile testing was done on "green or uncured" polymers.

What is claimed is:

1. A copolymer comprising the structure

where X is a polyisoprene;

Z comprises a polymer derived from a monomer having a hydrogen bond donor site and a hydrogen bond acceptor site;

Y is a dithiol linking group comprising the structure

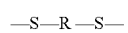

where S is sulfur and R is a divalent organic group, and one S is covalently bonded to X through a thioether linkage and the other S is covalently bond to Z through a thioether linkage; and n is the number of $-[-Y-Z]$ groups bonded to X, wherein n ranges from about 2 to about 30.

2. The copolymer of claim 1, wherein Z comprises a polymer derived from a monomer of formula

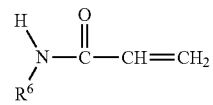

where R$^6$ is selected from the group consisting of C2 to C6 linear alkyl, C2 to C6 branched alkyl, and C3 to C6 cycloalkyl.

3. The copolymer of claim 1, wherein Z is selected from the group consisting of poly(N-isopropylacrylamide) and poly(N-cyclopropylacrylamide).

4. The copolymer of claim 1, wherein the polymer Z has a weight average molecular weight ranging from about 500 to about 20000 g/gmol.

5. The copolymer of claim 1, comprising from about 1 to about 20 weight percent Z.

6. The copolymer of claim 1, wherein Z comprises a polymer of formula

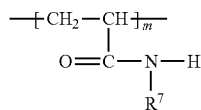

where $R^7$ is selected from the group consisting of C2 to C6 linear alkyl, C2 to C6 branched alkyl, and C3 to C6 cycloalkyl, and m is the degree of polymerization of the hydrocarbon chain.

7. The copolymer of claim 1, wherein Z further comprises a terminal maleimide group covalently bonded to a sulfur of Y.

8. The copolymer of claim 1, wherein Y is derived from a polyethylene glycol dithiol.

9. The copolymer of claim 1, wherein R is —[(CH$_2$)$_2$—O—]$_k$—(CH$_2$)$_2$— where k is an integer ranging from 1 to 10.

10. The copolymer of claim 1, wherein R is —(CH$_2$)$_2$—O—(CH$_2$)$_2$—O—(CH$_2$)$_2$—.

11. The copolymer of claim 1, wherein the polyisoprene comprises a microstructure comprising grater than 98 percent by weight of cis 1,4 linkages.

12. The copolymer of claim 1, wherein the polyisoprene comprises hydroxyl groups.

13. The copolymer of claim 1, wherein the polyisoprene comprises oxirane groups.

14. A rubber composition comprising the copolymer of claim 1.

15. A pneumatic tire comprising the rubber composition of claim 14.

* * * * *